United States Patent
Kasahara

(10) Patent No.: US 7,310,951 B2
(45) Date of Patent: Dec. 25, 2007

(54) STEADY-STATE DETONATION COMBUSTOR AND STEADY-STATE DETONATION WAVE GENERATING METHOD

(75) Inventor: Jiro Kasahara, Muroran (JP)

(73) Assignee: Hokkaido Technology Licensing Office Co., Ltd., Sapporo-shi (JP)

( * ) Notice: Subject to any disclaimer, the term of this patent is extended or adjusted under 35 U.S.C. 154(b) by 614 days.

(21) Appl. No.: 10/509,903

(22) PCT Filed: Apr. 19, 2002

(86) PCT No.: PCT/JP02/03921

§ 371 (c)(1),
(2), (4) Date: Sep. 29, 2004

(87) PCT Pub. No.: WO03/089773

PCT Pub. Date: Oct. 30, 2003

(65) Prior Publication Data

US 2005/0079461 A1    Apr. 14, 2005

(51) Int. Cl.
*F02C 7/22* (2006.01)
*F02C 5/00* (2006.01)

(52) U.S. Cl. .................. 60/776; 60/39.76; 60/247

(58) Field of Classification Search .......... 60/247, 60/39.76, 39.38, 776, 39.77, 39.78, 39.79, 60/39.8, 39.81, 248, 249, 39.4, 39.39; 431/1
See application file for complete search history.

(56) References Cited

U.S. PATENT DOCUMENTS

| 3,606,867 | A |   | 9/1971  | Briffa |
| 3,738,290 | A | * | 6/1973  | Belter ...................... 110/344 |
| 3,853,453 | A | * | 12/1974 | Olsson ....................... 431/1 |
| 4,175,380 | A | * | 11/1979 | Baycura ................... 60/776 |
| 4,221,174 | A | * | 9/1980  | Smith et al. ............... 110/265 |
| 4,639,208 | A | * | 1/1987  | Inui et al. .................. 431/1 |

FOREIGN PATENT DOCUMENTS

| JP | 63-014013 | 1/1988 |
| JP | 07-247906 | 9/1995 |

* cited by examiner

Primary Examiner—Anthony Stashick
Assistant Examiner—Vikansha Dwivedi
(74) Attorney, Agent, or Firm—Flynn, Thiel, Boutell & Tanis, P.C.

(57) ABSTRACT

A steady-state detonation combustor and a steady-state detonation wave generating method, in which a stabilized detonation wave can be generated by generating a hypersonic and unburned premixed gas. An rich premixed gas whose gas fuel is rich is combusted in a rich premixed gas combustion chamber (11) to generate a fist high-temperature and high-pressure burned gas, while at the same time, a lean premixed gas whose oxygen is rich is combusted in a lean premixed gas combustion chamber (12) to generate a second high-temperature and high-pressure burned gas, and subsequently, after each high-temperature and high-pressure burned gas is accelerated to hypersonic speed and at the same time mixed together through an interpenetrating nozzle (40), a premixed gas obtained by the mixture and containing the gas fuel and the oxygen which are unreacted is impinged on a steady-state detonation stabilizer (60), so that a stabilized detonation wave is generated.

17 Claims, 7 Drawing Sheets

F I G. 2
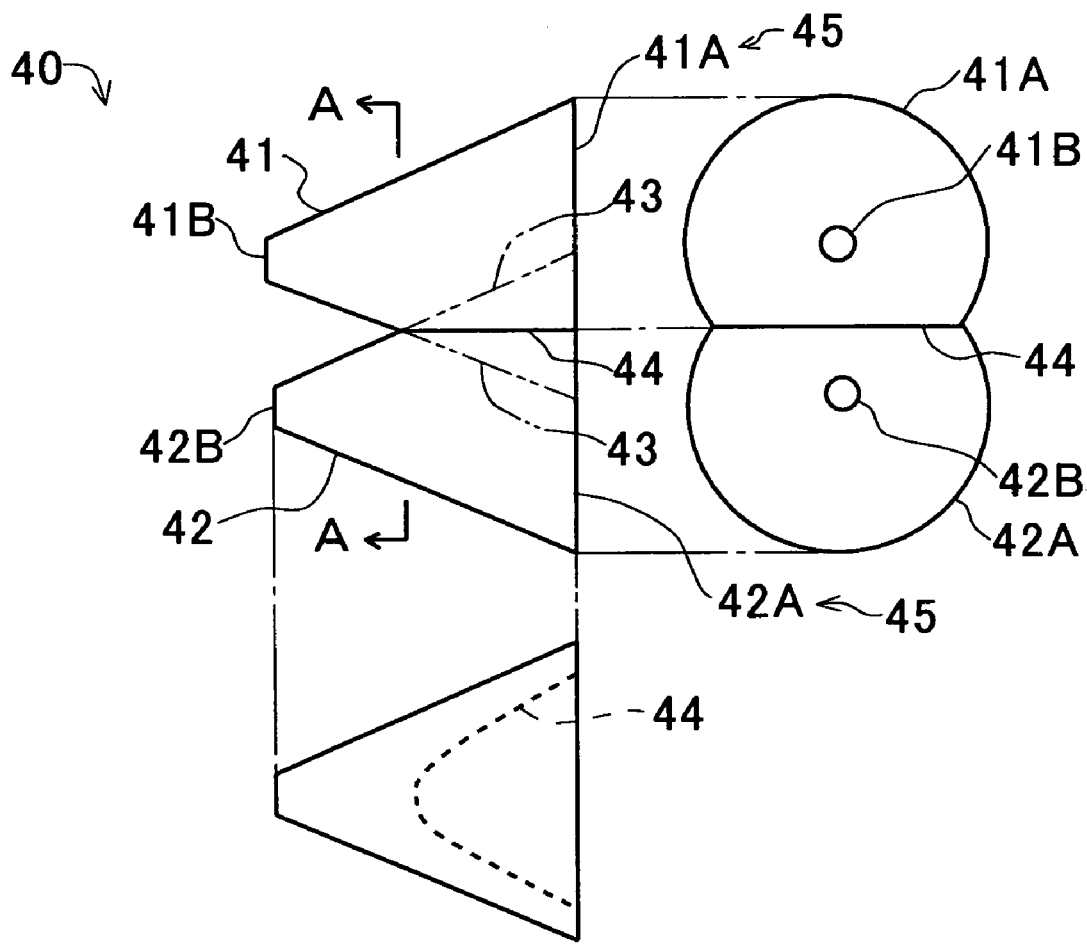
F I G. 3
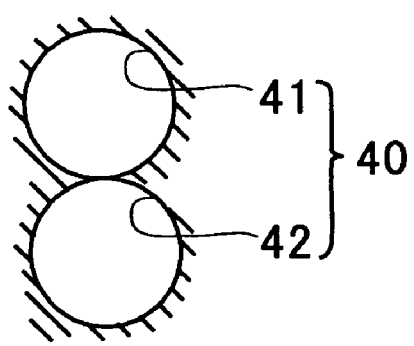

STEADY-STATE DETONATION COMBUSTOR AND STEADY-STATE DETONATION WAVE GENERATING METHOD

TECHNICAL FIELD

This invention relates to a steady-state detonation combustor and a steady-state detonation wave generating method, through which a detonation wave is generated in steady state with respect to a static system, allowing a premixed gas containing a gas fuel and oxygen to be combusted, and intended particularly to be used to an aerospace propulsion engine for an aerospace plane, a combustor for a power gas turbine, a detonation wave generator for basic researches, and so forth.

BACKGROUND ART

In general, a detonation wave is generated in such a manner that a detonation gas is encapsulated in a tube, and ignited at a tube end to induce a transition from a deflagration wave to a detonation wave. The detonation wave thus generated is difficult to be applied to engineering, since it propagates at extremely high (hypersonic) speed of two to three km/sec with respect to a laboratory system (static system). A steady-state propagation of the detonation wave in static state with respect to a laboratory system (static system) is a requisite for an application of the detonation wave, but no such apparatus has been developed so far.

Meanwhile, in order to maintain a steady-state detonation wave in static state in an experimental apparatus, there are two issues to be cleared, as follows.

To begin with, the first issue is to develop a stabilizer to stabilize a detonation wave with respect to a hypersonic premixed gas flowing within an experimental apparatus. Until recently, conditions to stabilize a detonation wave were uncertain among the detonation researchers, and thus development of such a stabilizer was impossible.

The second issue is to generate a premixed gas itself which is both hypersonic and unburned. This is deemed as an extremely difficult issue. Because, in general, in order to generate a hypersonic flow, a method is taken in which an operating gas is brought to be high-temperature and high-pressure, and such an internal energy is converted to a kinetic energy through a nozzle. However, when an unburned premixed gas is accelerated in the same manner, combustion takes place at a stage where the operating gas (unburned premixed gas) is brought to be high-temperature, so that the hypersonic flow that is generated is already in a state of completely burned. To cope with this, a method is contemplated in which a gas fuel (combustible gas) and oxygen are separately brought to be high-temperature, accelerated to be hypersonic, and mixed together thereafter. However, in this method, although the gas fuel and oxygen do not begin to react upon the acceleration as they are separate in becoming high-temperature, the time period necessary for the subsequent mixture becomes longer than a characteristic time of flow, meaning that the mixture itself is difficult. Also, an expensive heating apparatus is required to make the operating gas high-temperature and high-pressure, which is another problem.

Accordingly, it is an object of the present invention to provide a steady-state detonation combustor and a steady-state detonation wave generating method which allow generation of a stabilized detonation wave by generating a premixed gas which is both hypersonic and unburned.

DISCLOSURE OF THE INVENTION

The present invention includes a steady-state detonation combustor to combust a premixed gas containing a gas fuel and oxygen in such a manner that a detonation wave is generated in steady state with respect to a static system, where the steady-state detonation combustor includes: a rich premixed gas combustion chamber to combust a detonative rich premixed gas with the gas fuel being rich with respect to the oxygen; a lean premixed gas combustion chamber to combust a detonative lean premixed gas with the gas fuel being lean with respect to the oxygen; an interpenetrating nozzle including a plurality of nozzles arranged in an interpenetrating manner with each other, in which a first high-temperature and high-pressure burned gas containing an unreacted gas fuel obtained by combusting the rich premixed gas in the rich premixed gas combustion chamber and a second high-temperature and high-pressure burned gas containing an unreacted oxygen obtained by combusting the lean premixed gas in the lean premixed gas combustion chamber, respectively accelerated to hypersonic speed such that their static temperatures descend and they are mixed together; and a steady-state detonation stabilizer arranged at a position which bars a flow of a premixed gas containing the unreacted gas fuel and unreacted oxygen obtained by mixing the first high-temperature and high-pressure burned gas and the second high-temperature and high-pressure burned gas through the interpenetrating nozzle, to combust the premixed gas by generating an stabilized detonation wave through impingement of the premixed gas flowing at hypersonic speed through the interpenetrating nozzle.

Here, the number of nozzles constituting the "interpenetrating nozzle" is preferably two in light of structural simplification, but it is not a limitation, so that, for example, four nozzles, six nozzles, eight nozzles, and so forth, or odd-numbered nozzles may be used, meaning that at least two nozzles, including one nozzle through which the first high-temperature and high-pressure burned gas passes, and the other nozzle through which the second high-temperature and high-pressure burned gas passes, are arranged in an interpenetrating manner to each other to allow mixture of the first high-temperature and high-pressure burned gas and the second high-temperature and high-pressure burned gas.

Further, "the position that bars flow of the premixed gas" at which "the steady-state detonation stabilizer" is arranged is a position where a stagnation region or a subsonic region having a certain area or greater can be formed with respect to the stabilizer. Accordingly, "the steady-state detonation stabilizer" is an obstruction object in a manner of decreasing the cross sectional area of the flow path, by which the speed of the premixed gas flowing at hypersonic speed is decelerated.

In such a steady-state detonation combustor according to the present invention, the rich premixed gas is combusted in the rich premixed gas combustion chamber to generate the first high-temperature and high-pressure burned gas containing the unreacted gas fuel, while the lean premixed gas is combusted in the lean premixed gas combustion chamber to generate the second high-temperature and high-pressure burned gas containing the unreacted oxygen, and thereafter, these first and second high-temperature and high-pressure burned gases are accelerated and mixed through the interpenetrating nozzle. In other words, the rich premixed gas and the lean premixed gas are prepared, and these rich premixed gas and lean premixed gas are combusted in separate combustion chambers respectively to be high-temperature and high-pressure, so that the first and second high-temperature and high-pressure burned gases which, in spite of being high-temperature and high-pressure, respectively include the unreacted gas fuel and the unreacted oxygen are generated, which are then accelerated and mixed through the interpenetrating nozzle. Then, after that, the accelerated and mixed gas is impinged on the steady-state detonation stabilizer, whereby a detonation wave is generated.

Accordingly, the disadvantage of the prior arts that the combustion is already completed at a stage of making the operating gas high-temperature in order to obtain a hypersonic flow can be eliminated, allowing generation of a premixed gas which is both hypersonic and unburned, whereby the above-described second issue can be cleared.

Further, the chemical energy of the gas can be separated into a heat energy for generating a hypersonic flow and an exothermic reaction in the detonation wave, so that the generation of the hypersonic flow and the generation of the detonation wave come to be possible with an extremely simple structure and at a low cost.

Furthermore, since quantitative conditions for stabilizing the detonation wave are identified and the steady-state detonation stabilizer is arranged in a manner of fulfilling such conditions, the detonation wave can be generated in steady state with respect to a static system and kept as it is, whereby the above-described first issue can be cleared.

Further, the use of the interpenetrating nozzle promotes the mixture and at the same time accelerates the flow, avoiding an inconvenience of the mixture time being longer than the characteristic time of the flow, whereby the above-described object can be achieved.

Furthermore, it is preferable that the above-described steady-state detonation combustor is structured such that it is provided with simultaneous ignition apparatuses to simultaneously inject a high-temperature combustion gas jet into the rich premixed gas combustion chamber and the lean premixed gas combustion chamber, in which the simultaneous ignition apparatuses include: a simultaneous ignition chamber to encapsulate a detonative equivalent premixed gas which contains a gas fuel and oxygen mixed at an equivalence ratio of 1.0; an igniter to ignite the equivalent premixed gas encapsulated in the simultaneous ignition chamber; and injection controllers respectively provided between the simultaneous ignition chamber and the rich premixed gas combustion chamber, and between the simultaneous ignition chamber and the lean premixed gas combustion chamber, allowing the high-temperature and high-pressure gas obtained by combusting the equivalent premixed gas in the simultaneous ignition chamber to be simultaneously injected into the rich premixed gas combustion chamber and the lean premixed gas combustion chamber as a high-temperature combustion gas jet, so that the rich premixed gas and lean premixed gas in each combustion chamber can be ignited simultaneously.

Here, the "injection controller" is preferably an openable and closable valve in the case the injection is repeated, but where the injection is needed only once, a diaphragm, for example, may be provided which is burst through to inject the high-temperature combustion gas jet when the pressure of the gas in the simultaneous ignition chamber reaches a certain level.

Further, the ignition using the "igniter" is preferably performed through discharge.

If a simultaneous ignition apparatus is provided, a simultaneous ignition of the rich premixed gas in the rich premixed gas combustion chamber and the lean premixed gas in the lean premixed gas combustion chamber can assuredly be realized.

Further, the rich premixed gas and the lean premixed gas in the above-described steady-state detonation combustor are preferably any one type of mixed gases among a mixed gas of hydrogen and oxygen, a mixed gas of hydrocarbon of methane series including methane, ethane, propane, butane, pentane, and hexane and oxygen, a mixed gas of hydrocarbon of ethylene series including ethylene and propylene and oxygen, a mixed gas of acetylene and oxygen, or a mixed gas of ammonia and oxygen.

Furthermore, in the above-described steady-state detonation combustor, it is preferable that an equivalence ratio of the gas fuel with respect to the oxygen in the rich premixed gas is 1.2-2.0, and an equivalence ratio of the gas fuel with respect to the oxygen in the lean premixed gas is 0.3-0.8.

Moreover, in the above-described steady-state detonation combustor, it is preferable that a ratio of the volume of the lean premixed gas combustion chamber with respect to the volume of the rich premixed gas combustion chamber is 0.5-2.0.

Further, in the above-described steady-state detonation combustor, a ratio of the volume capacity of the simultaneous ignition chamber with respect to the total volume capacity of the rich premixed gas combustion chamber and the lean premixed gas combustion chamber is preferably 1/5-1/30.

Furthermore in the above-described steady-state detonation combustor, it is preferable that: the ratio of the cross sectional area of the interpenetration starting point with respect to the cross sectional area of the throat portion of the interpenetrating nozzle is preferably 10 or greater; the ratio of the cross sectional area of the outlet portion with respect to the cross sectional area of the throat portion is 25 or greater; and the cross sectional area of the interpenetration starting point is smaller than the cross sectional area of the outlet portion. Here, the cross sectional area of the throat portion is a sum of cross sectional areas of each throat portion of the plural nozzles constituting the interpenetrating nozzle. So long as these relationships are kept, areas of each cross section constituting the interpenetrating nozzle may be expanded monotonically and smoothly from the throat portion to the outlet portion, and a plane forming the interpenetrating nozzle may be an arbitrary curved plane.

The "interpenetrating nozzle" having such a preferable structure can be formed by an arbitrary curved plane so long as the above conditions are fulfilled, however, from the standpoint of structural simplification, manufacturing facilitation, and the like, the following an interpenetrating nozzle formed by a pair of cone-shaped nozzles in parallel and interpenetrating can be cited as a tangible structural example which is particularly preferable.

For example, cited is an interpenetrating nozzle which includes two identically shaped cone nozzles, with each outlet portion and each throat portion thereof being arranged on the same plane, and axes of each cone nozzle being arranged in parallel, such that each cone nozzle is interpenetrating, with the interpenetrating portion being cut out (for example, as in the cases of FIG. 2 and FIG. 3 referred to later).

Further, cited as an interpenetrating nozzle of another structure is one which includes two identically shaped, isosceles-triangle plate nozzles, with each outlet portion and each throat portion of these plate nozzles arranged on a same plane and center lines of each plate nozzle being arranged in parallel, thus allowing the plate nozzles to interpenetrate each other, with the interpenetrating portion being cut out (for example, as in the case of FIG. 8 referred to later and the like).

Furthermore, envisaged as the "steady-state detonation stabilizer" are an external flow type stabilizer in which a gas flows externally (circumferentially) with respect to an obstruction object, and an internal flow type stabilizer in which a gas flows internally with respect to an obstruction object, and more specifically, ones having the following structures can be presented.

As an example of an external flow type structure, a steady-state detonation stabilizer can be cited whose tip portion receiving a flow of a premixed gas passing through the interpenetrating nozzle is hemispheric, and a supporting portion supporting the hemispheric tip portion is cylindrical (for example, as in the case of FIG. 4 referred to later).

Further, as another external flow type structure, a steady-state detonation stabilizer can be cited whose tip portion receiving a flow of a premixed gas passing through the interpenetrating nozzle is conical and a supporting portion supporting said conical tip portion is cylindrical (for example, as in the case of FIG. 9 referred to later).

Furthermore, as still another external flow type structure, cited is a steady-state detonation stabilizer whose tip portion receiving a flow of a premixed gas passing through the interpenetrating nozzle is polygonal cone shaped, and a supporting portion supporting the polygonal cone shaped tip portion is polygonal column shaped (for example, as in the case of FIG. 10 referred to later and the like). Here, the polygonal cone shape includes a pyramid shape having any angles of three or more, such as triangular pyramid, quadrangular pyramid, pentagonal pyramid, hexagonal pyramid, and so forth, while the polygonal column shape includes a columnar shape having any angles of three or more, such as triangular prism, square prism, pentagonal prism, hexagonal prism, and so forth.

On the other hand, presented as an internal flow type structure is a steady-state detonation stabilizer which includes two two-dimensional wedges arranged oppositely to each other, with each peak portion of these two-dimensional wedges being arranged on a same plane which is orthogonal to a flow direction of the premixed gas passing through the interpenetrating nozzle (for example, as in the case of FIG. 11 referred to later and the like).

Further, presented as another internal flow type structure is a steady-state detonation stabilizer which includes two conical, convergent to divergent shaped nozzles arranged in a manner that their convergent portions are coupled on each other, with each axis of these convergent to divergent shaped nozzles coinciding, and each axis being arranged in a direction along a flow direction of the premixed gas passing through the interpenetrating nozzle (for example, as in the case of FIG. 12 referred to later).

Further, the present invention includes a steady-state detonation wave generating method to generate a detonation wave in steady state with respect to a static system, which is characterized in that a detonative rich premixed gas with its gas fuel being in a rich state with respect to the oxygen, is infused into a rich premixed gas combustion chamber, while at the same time a detonative lean premixed gas, with its gas fuel in a lean state with respect to the oxygen, is infused into a lean premixed gas combustion chamber, and by simultaneously igniting these rich premixed gas and lean premixed gas, the rich premixed gas is combusted in the rich premixed gas combustion chamber to generate a first high-temperature and high-pressure burned gas containing an unreacted gas fuel, while at the same time the lean premixed gas is combusted in the lean premixed gas combustion chamber to generate a second high-temperature and high-pressure burned gas containing unreacted oxygen, after which the first and the second high-temperature and high-pressure burned gases are, by using an interpenetrating nozzle composed of a plurality of nozzles arranged in an interpenetrating manner, respectively accelerated to hypersonic speed such that their static temperatures descend and they are mixed together, and a premixed gas flow obtained by mixing the first and the second high-temperature and high-pressure burned gases is barred by a static-state detonation stabilizer, such that a stabilized detonation wave can be generated.

With such a steady-state detonation wave generating method according to the present invention, the operations and effects obtained by the above-described steady-state detonation combustor of the present invention can be attained as they are, resulting in achievement of the aforementioned objects.

BRIEF DESCRIPTION OF DRAWINGS

FIG. 2 is a detailed block diagram of an interpenetrating nozzle of the above-described embodiment;

FIG. 3 is a sectional view taken along the A-A line in FIG. 2;

BEST MODE FOR CARRYING OUT THE INVENTION

In order to describe the present invention in further detail, an explanation will be carried out according to attached drawings hereto.

Figure 1:
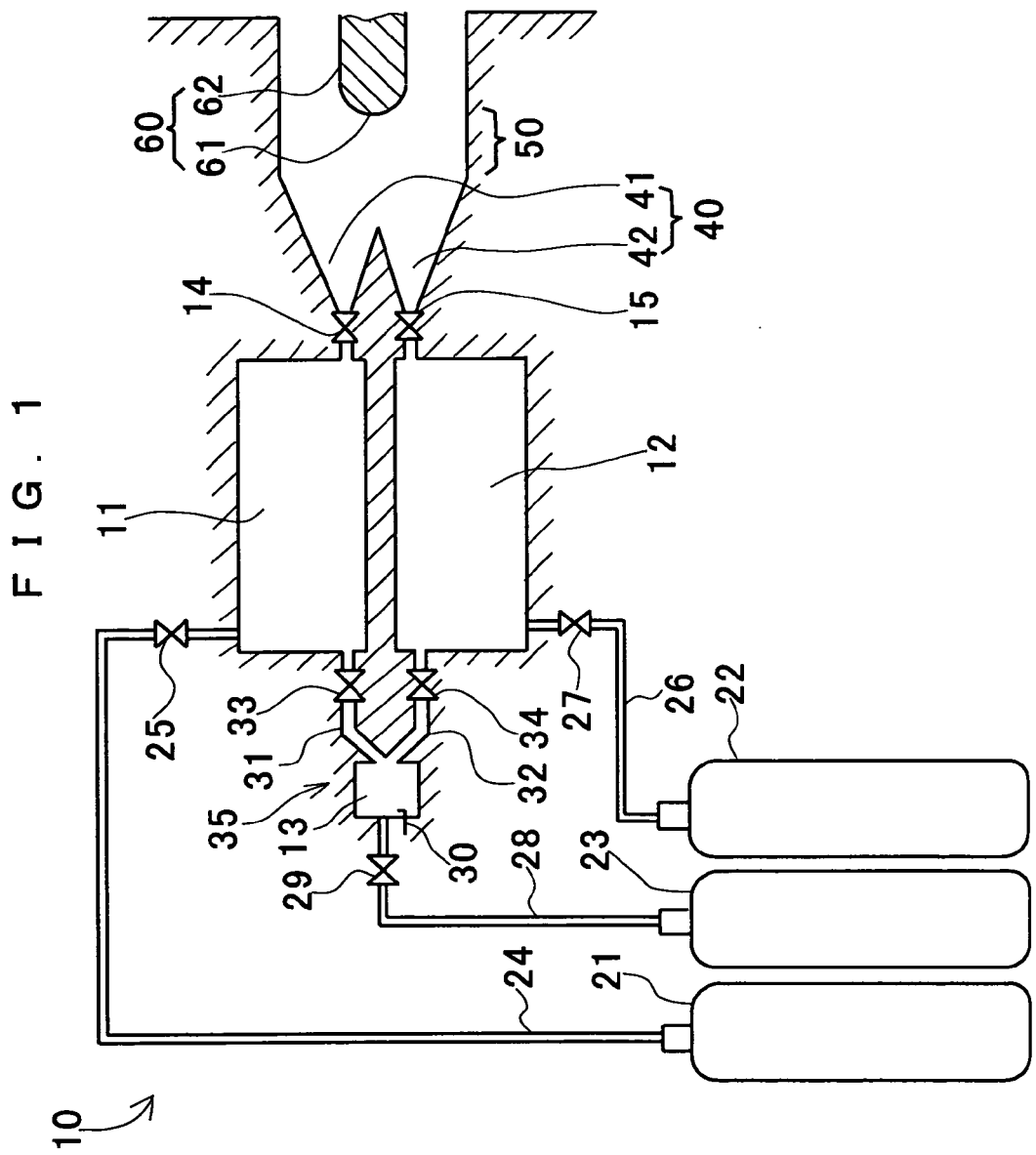
FIG. 1 is an overall block diagram of a steady-state detonation combustor of an embodiment of the present invention.

FIG. 1 shows an overall block diagram of a steady-state detonation combustor 10 according to an embodiment of the present invention.

In FIG. 1, the steady-state detonation combustor 10 includes: a rich premixed gas combustion chamber 11 to combust a detonative rich premixed gas; a lean premixed gas combustion chamber 12 to combust a detonative lean premixed gas; a simultaneous ignition chamber 13 to encapsulate a detonative equivalent premixed gas; a rich premixed gas source 21 to supply the rich premixed gas to the rich premixed gas combustion chamber 11; a lean premixed gas source 22 to supply the lean premixed gas to the lean premixed gas combustion chamber 12; an equivalent premixed gas source 23 to supply the equivalent premixed gas to the simultaneous ignition chamber 13; an igniter 30 to ignite the equivalent premixed gas encapsulated in the simultaneous ignition chamber 13; an interpenetrating nozzle 40 to accelerate and mix each high-temperature and high-pressure burned gas generated in the rich premixed gas combustion chamber 11 and the lean premixed gas combustion chamber 12; a mixture promoting portion 50 provided at a rear flow side of the interpenetrating nozzle 40; and a steady-state detonation stabilizer 60 arranged at a rear flow side of the mixture promoting portion 50.

Further, provided halfway of a rich premixed gas supply path 24 connecting the rich premixed gas source 21 and the rich premixed gas combustion chamber 11 is a valve 25 which is openable and closable, provided halfway of a lean premixed gas supply path 26 connecting the lean premixed gas source 22 and the lean premixed gas combustion chamber 12 is a valve 27 which is openable and closable, and provided halfway of an equivalent premixed gas supply path 28 connecting the equivalent premixed gas source 23 and the simultaneous ignition chamber 13 is a valve 29 which is openable and closable.

Furthermore, provided between the simultaneous ignition chamber 13 and the rich premixed gas combustion chamber 11 and between the simultaneous ignition chamber 13 and the lean premixed gas combustion chamber 12 are communication paths 31, 32 respectively communicating each chamber, and provided halfway of the communication paths 31, 32 respectively are valves 33, 34 as injection controllers which are openable and closable. Further, the simultaneous ignition chamber 13, the igniter 30, and the valves 33, 34 form a simultaneous ignition apparatus 35 to simultaneously ignite the rich premixed gas and the lean premixed gas by simultaneously injecting a high-temperature combustion gas jet from the simultaneous ignition chamber 13 to the rich premixed gas combustion chamber 11 and the lean premixed gas combustion chamber 12.

Here, the ignition of the equivalent premixed gas by the igniter 30 is performed by discharge for example, and so forth. The igniter 30 may be an apparatus which provides a gas with an energy density and energy sufficient enough to start a combustion reaction, and for example, an ignition plug for automotives and so forth can be suitably used. Further, each valve 33, 34 should be able to speedily control opening and closing thereof by forming itself by an electromagnetic valve and the like, and should function as an injection controller to simultaneously ignite the rich premixed gas and the lean premixed gas in each combustion chamber 11, 12 respectively, by simultaneously injecting the high-temperature and high-pressure gas (for example, a gas having about tenfold higher temperature and pressure) obtained by combusting the equivalent premixed gas in the simultaneous ignition chamber 13 to the rich premixed gas combustion chamber 11 and the lean premixed gas combustion chamber 12.

Further, provided between the rich premixed gas combustion chamber 11 and the interpenetrating nozzle 40 and between the lean premixed gas combustion chamber 12 and the interpenetrating nozzle 40 are communication paths 14, 15 communicating these in-between spaces.

The rich premixed gas supplied from the rich premixed gas source 21 to the rich premixed gas combustion chamber 11, being a detonation gas with a gas fuel and oxygen being premixed, is a gas with the gas fuel being excessively mixed with respect to the oxygen, in other words, a gas with a gas fuel of high concentration. An equivalence ratio of the gas fuel with respect to the oxygen in the rich premixed gas is preferably 1.2-2.0 considering, besides others, a need to appropriately separate a chemical energy of the gas into a heat energy for generating a hypersonic flow and an exothermic reaction in a detonation wave.

On the other hand, the lean premixed gas supplied from the lean premixed gas source 22 to the lean premixed gas combustion chamber 12, being a detonation gas with a gas fuel being premixed with oxygen, is a gas with the oxygen being excessively mixed with respect to the gas fuel, in other words, a gas with a gas fuel of low concentration. An equivalence ratio of the gas fuel with respect to the oxygen in the lean premixed gas is preferably 0.3-0.8 considering, besides others, a need to appropriately separate a chemical energy of the gas into a heat energy for generating a hypersonic flow and an exothermic reaction in a detonation wave.

Further, the equivalent premixed gas supplied from the equivalent weight mixed gas source 23 to the simultaneous ignition chamber 13 is a detonation gas with a gas fuel being premixed with oxygen at an equivalence ratio of 1.0.

Furthermore, used as detonation gases for these rich premixed gas and lean premixed gas, as well as for the equivalent premixed gas are, for example, a mixed gas of hydrogen and oxygen, a mixed gas of hydrocarbon of methane series (methane, ethane, propane, butane, pentane, and hexane) and oxygen, a mixed gas of hydrocarbon of ethylene series (ethylene, propylene) and oxygen, a mixed gas of acetylene and oxygen, a mixed gas of ammonia and oxygen, and so forth. Additionally, each of these premixed gases may be diluted with nitrogen, a rare gas, and so forth.

A ratio of the volume capacity of the volume capacity of the lean premixed gas combustion chamber 12 with respect to the rich premixed gas combustion chamber 11 is preferably 0.5-2.0, and for example 1.0, considering a need to make the mixture ratio of each high-temperature and high-pressure burned gas through the interpenetrating nozzle 40 appropriate, and realize a smooth continuous operation, and so forth.

Further, a ratio of the volume capacity of the simultaneous ignition chamber 13 with respect to the summed volume capacity of the rich premixed gas combustion chamber 11 and the lean premixed gas combustion chamber 12 is preferably 1/5-1/30, and for example 1/10 or the like, considering a need to ensure ignition of the rich premixed gas and the lean premixed gas, and so forth.

Furthermore, each of volume capacities of the rich premixed gas source 21, lean premixed gas source 22, and equivalent premixed gas source 23 is preferably five times or more greater than each of the volume capacities of the rich premixed gas combustion chamber 11, lean premixed gas combustion chamber 12, and simultaneous ignition chamber 13, respectively. Further, each pressure of the rich premixed gas source 21, lean premixed gas source 22, and equivalent premixed gas source 23 should be set higher than the initial pressures of the rich premixed gas combustion chamber 11, lean premixed gas combustion chamber 12, and simultaneous ignition chamber 13, respectively. Temperatures of each of the gas sources 21 to 23 should be 200K or higher, which may be a room temperature for example.

Each shape of the rich premixed gas combustion chamber 11, lean premixed gas combustion chamber 12, and simultaneous ignition chamber 13 is arbitrary and may be a cylindrical shape, for example.

FIG. 2 shows a detailed structure of the interpenetrating nozzle 40. With the interpenetrating nozzle 40, a first high-temperature and high-pressure burned gas containing an unreacted gas fuel obtained by combusting the rich premixed gas in the rich premixed gas combustion chamber 11, and a second high-temperature and high-pressure burned gas containing an unreacted oxygen obtained by combusting a lean premixed gas in the lean premixed gas combustion chamber 12, are respectively accelerated to hypersonic speed such that their static temperatures descend and at the same time they are mixed together.

In FIG. 1 and FIG. 2, the interpenetrating nozzle 40 includes a plurality of nozzles (in the present embodiment, as an example, two nozzles) 41 and 42 in combination arranged in an interpenetrating manner.

As shown in FIG. 2, each of nozzles 41 and 42 is a conical nozzle having an identical shape. Each of outlet portions 41A, 42A of each of these nozzles 41, 42 is arranged on the same plane, and at the same time, each of throat portions thereof 41B, 42B is also arranged on the same plane. Further, axes of each of the nozzles 41, 42 are arranged in parallel. With such an arrangement, the conical surface of each of the nozzles 41, 42 gradually expands from the vertex, causing an overlap, resulting in formation of an interpenetrating portion 43 of each of the nozzles 41, 42, as shown with a chain-double dashed line in FIG. 2. Accordingly, the interpenetrating nozzle 40 is formed such that, the interpenetrating portion 43 is cut out as a space, and a boundary line 44 between each of the nozzles 41, 42 is a chevron curve formed by crossing the conical surfaces.

FIG. 3 shows a cross section along the A-A line in FIG. 2. The position of the A-A line is an interpenetration starting point from which the interpenetration of the each of the nozzles 41, 42 starts, and as shown in FIG. 3, a cross section of the interpenetration starting point is in a state such that the two circular cross sections are in contact. Accordingly, the high-temperature and high-pressure burned gases of the two kinds do not contact each other from the throat portions 41B, 42B to the interpenetration starting point.

A ratio of the cross sectional area of the interpenetration starting point (position of the A-A line) with respect to the summed cross sectional areas of the two throat portions 41B, 42B of the interpenetrating nozzle 40 is 10 or greater, and a ratio of the cross sectional area of an outlet portion 45 (an opening portion formed by each of the outlet portions 41A and 42A being overlapped) with respect to the summed cross sectional areas of the two throat portions 41B, 42B is 25 or greater. Further, the cross sectional area of the interpenetration starting point (position of the A-A line) is smaller than the cross sectional area of the outlet portion 45. Additionally, the cross sectional area of the interpenetrating nozzle 40 at the interpenetration starting point is determined so as to be an area with which the gas temperature becomes sufficiently low by the time the interpenetration starting point is reached. Further, at the outlet portion 45, the gas needs to be accelerated to speed faster than the propagation speed of the detonation wave, and the cross sectional area of the outlet should take a value fulfilling that condition.

In FIG. 1, the mixture promoting portion 50 is a portion to promote mixture of the gases having passed through the interpenetrating nozzle 40. The cross sectional area of the mixture promoting portion 50 is greater than the cross sectional area of the outlet portion 45 of the interpenetrating nozzle 40. In addition, the length thereof in the flowing direction is arbitrary.

Figure 4:
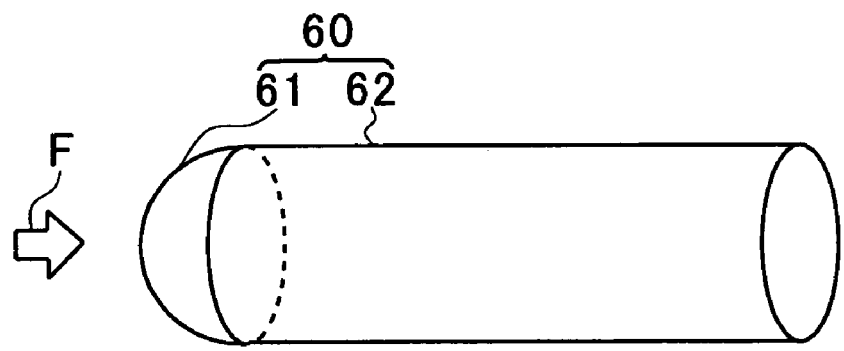
FIG. 4 is a detailed block diagram of a steady-state detonation stabilizer of the above-described embodiment.

FIG. 4 shows a detailed structure of a steady-state detonation stabilizer 60. The steady-state detonation stabilizer 60 is for combusting a premixed gas by generating a stabilized detonation wave through impingement of the premixed gas containing an unreacted gas fuel and unreacted oxygen flowing at hypersonic speed through the interpenetrating nozzle 40 and the mixture promoting portion 50.

In FIG. 1 and FIG. 4, the steady-state detonation stabilizer 60 is arranged in a position barring the flow of the premixed gas containing the unreacted gas fuel and the unreacted oxygen obtained by mixing the first high-temperature and high-pressure burned gas and the second high-temperature and high-pressure burned gas through the interpenetrating nozzle 40, in other words, the flow of the gas passing through the mixture promoting portion 50 discharged from the interpenetrating nozzle 40.

As shown in FIG. 4, the steady-state detonation stabilizer 60 includes a tip portion 61 to receive a premixed gas flow (shown by an arrow "F" in the drawing) passing through the interpenetrating nozzle 40 and the mixture promoting portion 50, and a supporting portion 62 to support the tip portion 61, and is an external flow type stabilizer, meaning that the gas flows externally (circumferentially) with respect to the stabilizer as an obstruction object. Further, the tip portion 61 is hemispheric, and the supporting portion 62 is cylindrical.

Further, in the case of a hydrogen-oxygen premixed gas, for example, the static pressure of the premixed gas impinging on the tip portion 61 should be set such that a Mach number at the outlet portion 45 of the interpenetrating nozzle 40 is 5.3 or greater, and preferably six or greater, so as to fulfill conditions to stabilize the steady-state detonation wave around the steady-state detonation stabilizer 60, and further that, a detonation cell size (a size uniquely determined according to the elements and state of the premixed gas; a cell width), which is the characteristic length of the detonation, becomes one fifth or smaller of the diameter of the hemispheric tip portion 61. That is to say, the initial pressure of the premixed gas should be raised until the cell size becomes one fifth or smaller of the diameter of the hemispheric tip portion 61. Incidentally, in the case of the hydrogen-oxygen premixed gas, it is possible to form a further stabilized steady-state detonation wave by accelerating the premixed gas faster than the value shown hereinabove, and by making the initial pressure of the premixed gas high.

In the present embodiment as described above, the combustion through the steady-state detonation combustor 10 is performed as follows.

Figure 5:
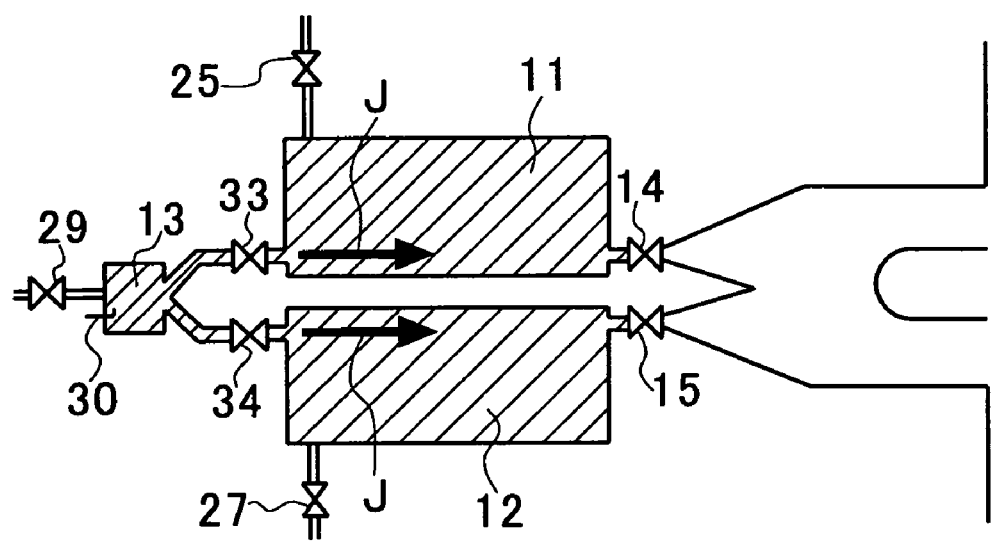
FIG. 5 is an explanatory view showing infusion and ignition of a premixed gas of the above-described embodiment.

FIG. 5 shows infusing and igniting procedures of the premixed gas. It is noted that the hatching in the drawing does not represent a cross section, but a gas infilling state. The same applies to the subsequent FIG. 6 and FIG. 7.

In FIG. 5, first, the valves 29, 25, 27 are opened while the valves 33, 34, 14, 15 are closed. The equivalent premixed gas is then infused into the simultaneous ignition chamber 13 from the equivalent premixed gas source 23; the rich premixed gas is infused into the rich premixed gas combustion chamber 11 from the rich premixed gas source 21; the lean premixed gas is infused into the lean premixed gas combustion chamber 12 from the lean premixed gas source 22; and the valves 29, 25, 27 are closed upon completion of all of these infusion procedures.

Subsequently, the igniter 30 is activated, and the equivalent premixed gas in the simultaneous ignition chamber 13 is ignited. After the ignition, when the pressure of the equivalent premixed gas ascends sufficiently (for example, when the pressure and temperature have become about tenfold higher), the valves 33, 34 are simultaneously opened, and a high-temperature combustion gas jet (shown by an arrow "J" in the drawing) is injected simultaneously to the rich premixed gas combustion chamber 11 and lean premixed gas combustion chamber 12. With this combustion gas jet, the rich premixed gas in the rich premixed gas combustion chamber and the lean premixed gas in the lean premixed gas combustion chamber 12 are ignited, and the pressures and temperatures of these gases ascend.

Here, in the rich premixed gas combustion chamber 11, the rich premix gas is combusted, generating the first high-temperature and high-pressure burned gas containing the unreacted gas fuel, while in the lean premixed gas combustion chamber 12, the lean premixed gas is combusted, generating the second high-temperature and high-pressure burned gas containing the unreacted oxygen.

Figure 6:
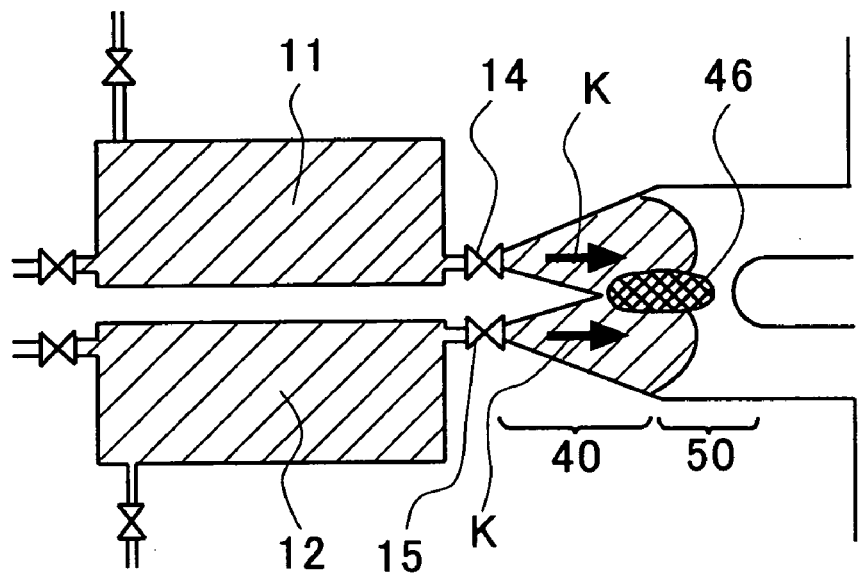
FIG. 6 is an explanatory view showing acceleration and mixture of a high-temperature and high-pressure burned gas using the interpenetrating nozzle of the above-described embodiment.

FIG. 6 shows accelerating and mixing procedures of the high-temperature and high-pressure burned gases through the interpenetrating nozzle 40.

In FIG. 6, when the valves 14 and 15 are opened with the pressures and temperatures of the gases in each of the combustion chambers 11, 12, having ascended, the first high-temperature and high-pressure burned gas generated in the rich premixed gas combustion chamber 11 and the second high-temperature and high-pressure burned gas generated in the lean premixed gas combustion chamber 12 are accelerated by passing through the interpenetrating nozzle 40 (shown by an arrow "K" in the drawing) and mixed together (shown by a shaded part 46 in the drawing).

Here, with the divergent of the interpenetrating nozzle 40, the gas is accelerated, and at the same time its temperature declines. It is noted that the two high-temperature and high-pressure burned gases are not in contact from the throat portions 41B, 42B to the interpenetration starting point (shown in the A-A line in the FIG. 2). The temperatures of the gases become sufficiently low by the time of reaching the interpenetration starting point, and thereafter, posteriorly to the interpenetration starting point, the gases are mixed through impingement, and at the outlet portion 45, the gases are accelerated to faster speed than the propagation speed of the detonation wave.

Figure 7:
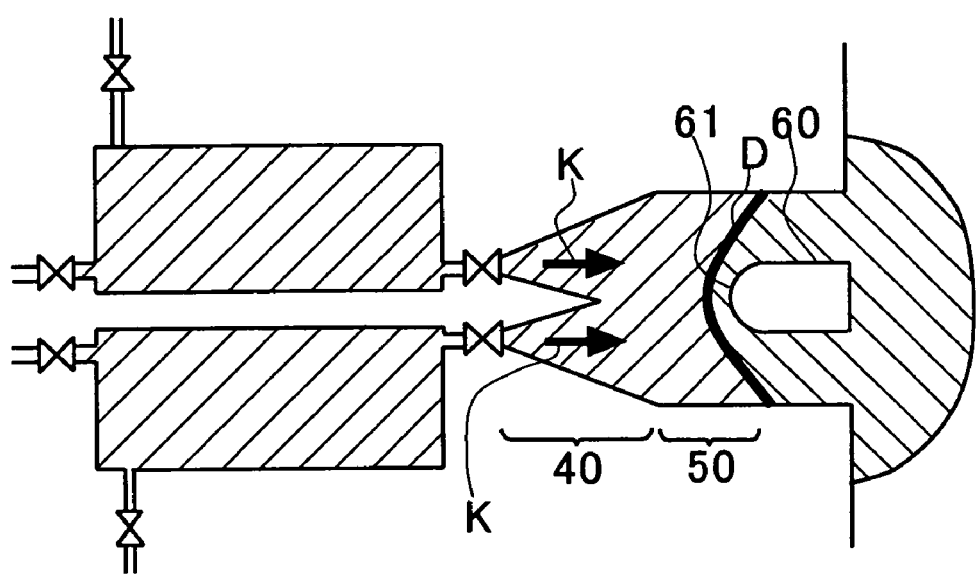
FIG. 7 is an explanatory view showing stabilization of the detonation wave using a steady-state detonation stabilizer of the above-described embodiment.

FIG. 7 shows stabilization procedures of the detonation wave by the steady-state detonation stabilizer 60.

In FIG. 7, the gases having passed through the interpenetrating nozzle 40 are promotedly mixed at the mixture promotion portion 50, and after that, impinge on the tip portion 61 of the steady-state detonation stabilizer 60. Then, an adiabatic compression at that time ignites the gas, and a detonation wave is generated. When the operation is in steady state, the oblique detonation wave D becomes arcuate in the neighborhood of the tip portion 61 of the steady-state detonation stabilizer 60, and at the same time, is stabilized in a manner of spreading around in an approximately conical shape as shown in FIG. 7.

In such a present embodiment, there are following effects. By combusting the rich premixed gas and the lean premixed gas separately in the combustion chambers 11, 12, to make them high-temperature and high-pressure, the steady-state detonation combustor 10 generates the first and the second high-temperature and high-pressure burned gases containing, in spite of both being high-temperature and high-pressure, the unreacted gas fuel and the unreacted oxygen respectively, and accelerates and mixes them through the interpenetrating nozzle 40, resulting in elimination of an inconvenience suffered by the prior art that the combustion is completed by the phase the temperature of the operating gas is made high in order to obtain a hypersonic flow, meaning that a premixed gas which is hypersonic and unburned can be generated.

As a result of this, the detonation wave can be generated by impingement of the generated premixed gas which is hypersonic and unburned on the steady-state detonation stabilizer 60.

In addition, since the steady-state detonation combustor 10 is capable of separating the chemical energy of the gas into an internal energy for generating a hypersonic flow and an exothermic reaction in the detonation wave, the generation of the hypersonic flow and the generation of the detonation wave can be realized with an extremely simple structure and at a low cost.

Further, since the quantitative conditions for stabilizing the detonation wave are identified and the steady-state detonation stabilizer 60 is arranged so as to fulfill the conditions, the detonation wave can be generated and maintained in steady state with respect to a static system.

In addition, the use of the interpenetrating nozzle 40 promotes mixture and at the same time accelerates the flow, so that the inconvenience that the mixture time becomes longer than the characteristic time of flow can be avoided.

Further, when the steady-state detonation combustor 10 is applied to a gas turbine, a high thermal efficiency can be maintained (for example, the thermal efficiency can be enhanced by 30%-50%) by performing isochoric combustion while keeping the detonation wave in a combustor of the gas turbine, so that the efficiency of the gas turbine can be dramatically improved. That is to say, when a thermal energy is abstracted by combusting a chemical fuel in the combustion chamber of the gas turbine, in general, the combustion is in a constant pressure (constant pressure combustion), however, the thermal efficiency (the ratio of work which can be abstracted with respect to the thermal energy provided to a system) of a combustion process at a constant volume (isochoric combustion) compared to the constant pressure combustion process is dramatically higher. Furthermore, the gas turbine can be microminiaturized since the detonation wave is in ultra high-speed combustion (a combustion having a propagation speed of 100-10,000 times faster than the normal flame).

Further, since the simultaneous ignition apparatus 35 is provided, the simultaneous ignition of the rich premixed gas in the rich premixed gas combustion chamber 11 and the lean premixed gas in the lean premixed gas combustion chamber 12 can be assuredly realized.

Furthermore, since openable and closable valves 33, 34 are employed as injection controllers forming the simultaneous ignition apparatus 35, injection can be repeated.

It should be noted that the present invention is not limited to the above-described embodiment, and includes therein any modification and the like within a range allowing the object of the present invention to be achieved.

Figure 8:
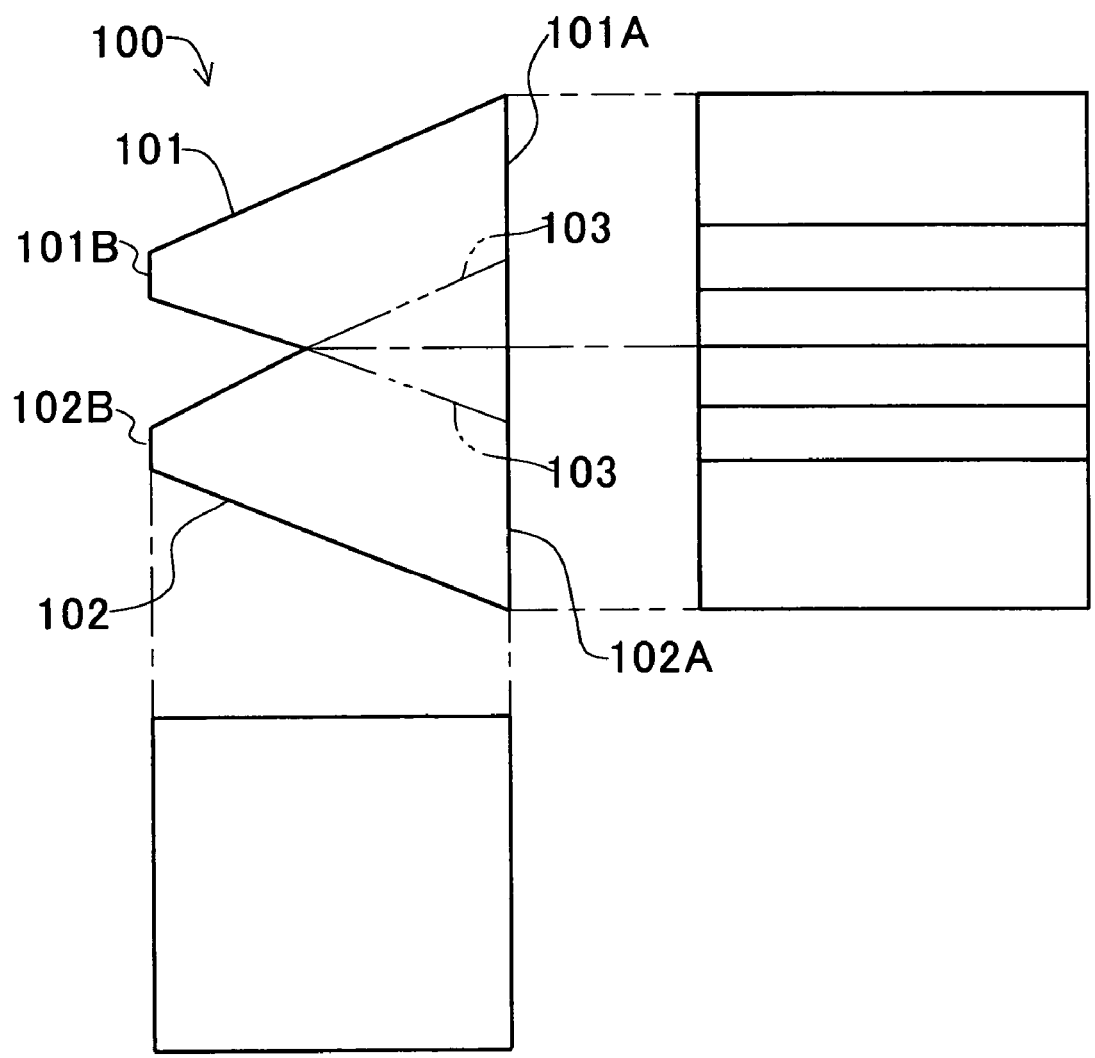
FIG. 8 is a detailed block diagram of an interpenetrating nozzle, which is a modified embodiment of the present invention.

That is to say, in the above-described embodiment, the interpenetrating nozzle 40 is formed in combination of two identically-shaped conical nozzles 41, 42, however, the interpenetrating nozzle of the present invention is not limited to be thus structured, and maybe an interpenetrating nozzle 100 as shown in FIG. 8, for example. In FIG. 8, the interpenetrating nozzle 100 includes two identically-shaped, isosceles-triangle plate nozzles 101, 102. Each of outlet portions 101A, 102A of the plate nozzles 101, 102 is arranged on the same plane, while each of throat portions 101B, 102B is arranged on the same plane. Further, center lines of each of the plate nozzles 101, 102 are arranged in parallel with each other. Furthermore, the interpenetrating nozzle 100 is formed such that interpenetrating portions 103 shown in chain-double dashed lines in the drawing are cut out.

Further, in the above-described embodiment, as shown in FIG. 4, in the steady-state detonation stabilizer 60, the tip portion 61 is hemispheric, and the supporting portion 62 is cylindrical, however, the structure of the steady-state detonation stabilizer is not limited to be as such, and essentially, the steady-state detonation stabilizer may be any obstruction object which decelerates the speed of a gas flowing in the hypersonic speed by minifying its cross section area of the flowing path, since, to sum up, generation of the detonation wave requires conversion into the thermal energy by decelerating the speed of the gas passing through the interpenetrating nozzle 40, raising its temperature and igniting it, while maintenance of the detonation wave requires a stagnation region or a subsonic region having an area of certain area or greater. Accordingly, for example, steady-state detonation stabilizers 200, 210, 220, 230 shown in FIG. 9 to FIG. 12, and so forth, are also acceptable.

Figure 9:
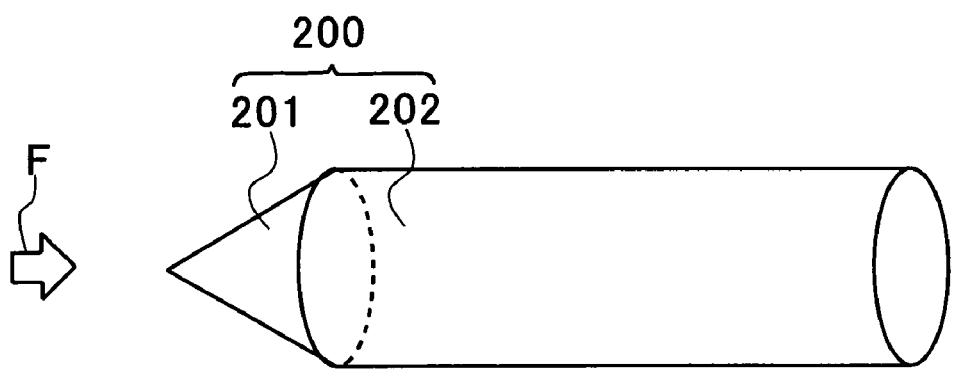
FIG. 9 is a detailed block diagram of a steady-state detonation stabilizer of an external flow type, which is a modified embodiment of the present invention.

In FIG. 9, the steady-state detonation stabilizer 200 is an external flow type stabilizer, with its tip portion 201 being conical and its supporting portion 202 being cylindrical.

Figure 10:
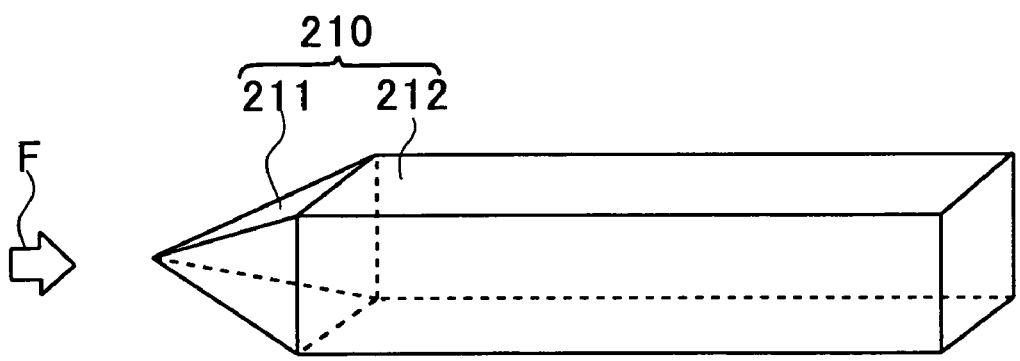
FIG. 10 is a detailed block diagram of a steady-state detonation stabilizer of another external flow type, which is a modified embodiment of the present invention.

In FIG. 10, the steady-state detonation stabilizer 210 is an external flow type stabilizer, with its tip portion 211 being polygonal cone shaped (for example, quadrangular pyramid shaped) and its supporting portion 212 is polygonal column shaped (for example, quadratic prism shaped).

Figure 11:
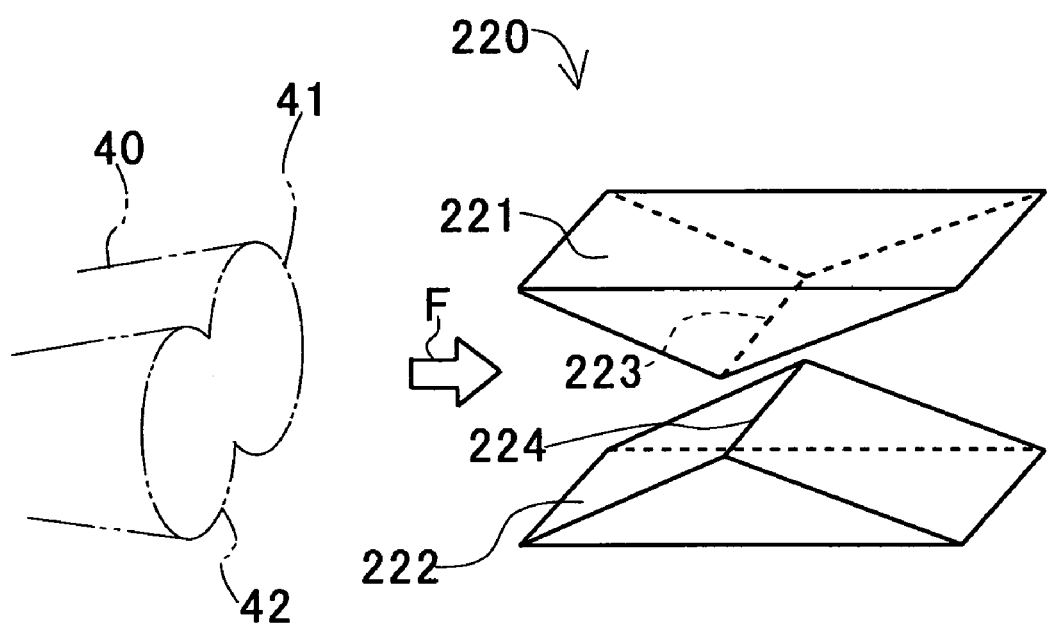
FIG. 11 is a detailed block diagram of a steady-state detonation stabilizer of an internal flow type, which is a modified embodiment of the present invention.

In FIG. 11, the steady-state detonation stabilizer 220 is an internal flow type stabilizer, and includes two two-dimensional wedges 221, 222 arranged oppositely to each other. Each of peak portions 223, 224 of these two-dimensional wedges 221, 222 is arranged on a same plane which is orthogonal to a flow direction of a premixed gas passing through the interpenetrating nozzle 40 (a direction shown by an arrow "F" in the drawing). Further, if each of the nozzles 41, 42 forming the interpenetrating nozzle 40 is arranged in the horizontal direction, each of the two-dimensional wedges 221, 222 is arranged in a direction orthogonal thereto, that is to say, in a vertical direction.

Figure 12:
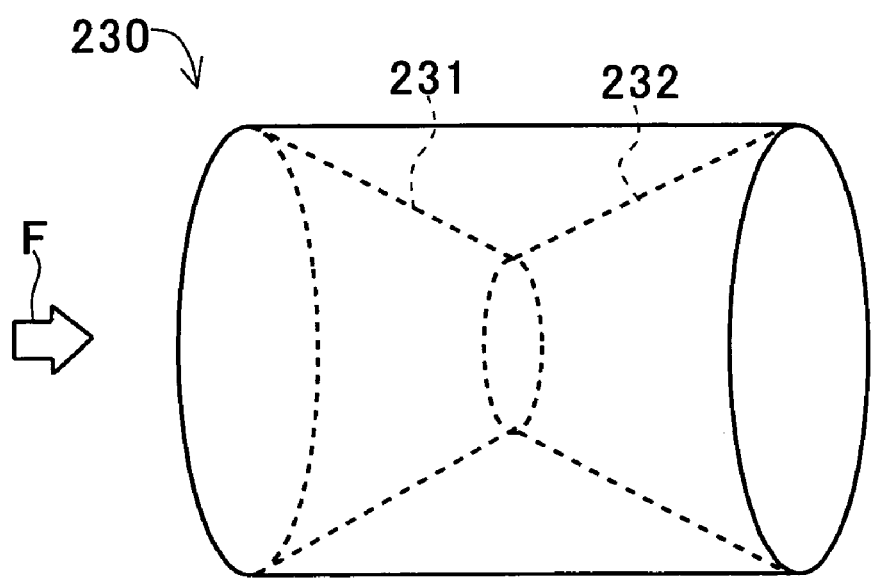
FIG. 12 is a detailed block diagram of a steady-state detonation stabilizer of another internal flow type, which is a modified embodiment of the present invention.

In FIG. 12, the steady-state detonation stabilizer 230 is an internal flow type stabilizer, and includes two conical and convergent to divergent shaped nozzles 231, 232 such that their respective convergent portion are coupled (hourglass-shaped). The axes of the convergent to divergent shaped nozzles 231, 232 coincide, and at the same time, each of the axes is arranged in a direction along a flow direction of a premixed gas passing through the interpenetrating nozzle 40 (the direction shown by the arrow "F" in the drawing).

INDUSTRIAL AVAILABILITY

As has been described, the steady-state detonation combustor and the steady-state detonation wave generating method are suitable to be applied to, for example, an aerospace propulsion engine for an aerospace plane, a combustor for a power gas turbine, a detonation wave generator for basic researches, and so forth.

The invention claimed is:

1. A steady-state detonation combustor to combust a premixed gas containing a gas fuel and oxygen by generating a detonation wave in steady state with respect to a static system, said steady-state detonation combustor comprising:

a rich premixed gas combustion chamber to combust a detonative rich premixed gas in which the gas fuel is in a rich state with respect to the oxygen;

a lean premixed gas combustion chamber to combust a detonative lean premixed gas in which the gas fuel is in a lean state with respect to the oxygen;

an interpenetrating nozzle including a plurality of nozzles arranged in an interpenetrating manner, in which a first high-temperature and high-pressure burned gas containing the gas fuel which is unreacted obtained by combusting the rich premixed gas in said rich premixed gas combustion chamber, and a second high-temperature and high-pressure burned gas containing the oxygen which is unreacted obtained by combusting said lean premixed gas in said lean premixed gas combustion chamber, are respectively accelerated to hypersonic speed, such that their static temperatures descend and at the same time they are mixed together; and a steady-state detonation stabilizer arranged at a position which bars a flow of a premixed gas containing the unreacted gas fuel and the unreacted oxygen obtained by mixing the first high-temperature and high-pressure burned gas and the second high-temperature and high-pressure burned gas through said interpenetrating nozzle, in which the premixed gas is combusted by generating, through impingement of the premixed gas flowing at hypersonic speed through the interpenetrating nozzle, the detonation wave which is stabilized.

2. The steady-state detonation combustor according to claim 1, further comprising a simultaneous ignition apparatus to inject a high-temperature combustion gas jet simultaneously to said rich premixed gas combustion chamber and said lean premixed gas combustion chamber, wherein said simultaneous ignition apparatus includes a simultaneous ignition chamber to encapsulate a detonative equivalent premixed gas which contains the gas fuel and the oxygen mixed at an equivalence ratio of 1.0, an igniter to ignite the equivalent premixed gas encapsulated in said simultaneous ignition chamber, and an injection controller respectively provided between the simultaneous ignition chamber and said rich premixed gas combustion chamber, and between the simultaneous ignition chamber and said lean premixed gas combustion chamber, wherein the injection controller is structured such that a high-temperature and high-pressure gas obtained by combusting the equivalent premixed gas in the simultaneous ignition chamber is simultaneously injected into said rich premixed gas combustion chamber and said lean premixed gas combustion chamber as a high-temperature combustion gas jet, so that the rich premixed gas and the lean premixed gas in each combustion chamber can be ignited simultaneously.

3. The steady-state detonation combustor according to claim 2, wherein the injection controller is an openable and closable valve, and ignition by the igniter is performed by discharge.

4. The steady-state detonation combustor according to claim 1, wherein the rich premixed gas and the lean premixed gas are any one type of mixed gases among a mixed gas of hydrogen and oxygen, a mixed gas of hydrocarbon of methane series including methane, ethane, propane, butane, pentane, and hexane and oxygen, a mixed gas of hydrocarbon of ethylene series including ethylene and propylene and oxygen, a mixed gas of acetylene and oxygen, or a mixed gas of ammonia and oxygen.

5. The steady-state detonation combustor according to claim 1, wherein an equivalence ratio of the gas fuel with respect to the oxygen in the rich premixed gas is 1.2-2.0, and an equivalence ratio of the gas fuel with respect to the oxygen in said lean premixed gas is 0.3-0.8.

6. The steady-state detonation combustor according to claim 1, wherein a ratio of a volume capacity of said lean premixed gas combustion chamber with respect to a volume capacity of said rich premixed gas combustion chamber is 0.5-2.0.

7. The steady-state detonation combustor according to claim 2, wherein a ratio of a volume capacity of the simultaneous ignition chamber with respect to a total volume capacity of said rich premixed gas combustion chamber and said lean premixed gas combustion chamber is 1/5-1/30.

8. The steady-state detonation combustor according to claim 1, wherein a ratio of a cross sectional area of an interpenetration starting point with respect to a cross sectional area of a throat portion of said interpenetrating nozzle is 10 or greater, a ratio of a cross sectional area of an outlet portion with respect to the cross sectional area of the throat portion is 25 or greater; and the cross sectional area of the interpenetration starting point is smaller than the cross sectional area of the outlet portion.

9. The steady-state detonation combustor according to claim 8, wherein said interpenetrating nozzle includes two identically shaped cone nozzles, with each outlet portion and each throat portion of the cone nozzles being arranged respectively on a same plane, and axes of the cone nozzles being arranged in parallel, such that each of the cone nozzles is interpenetrating, with the interpenetrating portion being cut out.

10. The steady-state detonation combustor according to claim 8, wherein said interpenetrating nozzle includes two identically shaped, isosceles-triangle plate nozzles, with each outlet portion and each throat portion of the plate nozzles being arranged respectively on a same plane and center lines of each plate nozzle being arranged in parallel, thus allowing the plate nozzles to interpenetrate each other, with the interpenetrating portion being cut out.

11. The steady-state detonation combustor according to claim 1, wherein, in said steady-state detonation stabilizer, a tip portion receiving a flow of a premixed gas passing through said interpenetrating nozzle is hemispheric, and a supporting portion supporting the hemispheric tip portion is cylindrical.

12. The steady-state detonation combustor according to claim 1, wherein, in said steady-state detonation stabilizer, a tip portion receiving a flow of a premixed gas passing through said interpenetrating nozzle is conical and a supporting portion supporting the conical tip portion is cylindrical.

13. The steady-state detonation combustor according to claim 1, wherein, in said steady-state detonation stabilizer, a tip portion receiving a flow of a premixed gas passing through said interpenetrating nozzle is polygonal cone shaped, and a supporting portion supporting the polygonal cone shaped tip portion is polygonal column shaped.

14. The steady-state detonation combustor according to claim 1, wherein said steady-state detonation stabilizer includes two two-dimensional wedges arranged oppositely to each other, with each peak portion of the two-dimensional wedges being arranged on a same plane which is orthogonal to a flow direction of the premixed gas passing through said interpenetrating nozzle.

15. The steady-state detonation combustor according to claim 1, wherein said steady-state detonation stabilizer includes two conical, convergent to divergent shaped nozzles arranged such that convergent portions thereof are coupled on each other, with each axis of the convergent to divergent shaped nozzles coinciding, and each axis being arranged in a direction along a flow direction of the premixed gas passing through said interpenetrating nozzle.

16. A steady-state detonation wave generating method in which a detonative detonation wave is generated in steady state with respect to a static system, said method comprising the steps of:

infusing a detonative rich premixed gas whose gas fuel is rich with respect to oxygen to a rich premixed gas combustion chamber, while at the same time infusing a detonative lean premixed gas whose gas fuel being lean with respect to the oxygen to an lean premixed gas combustion chamber;

combusting, by simultaneously igniting the rich premixed gas and the lean premixed gas, the rich premixed gas in the rich premixed gas combustion chamber to generate a first high-temperature and high-pressure burned gas containing the gas fuel which is unreacted, while at the same time combusting the lean premixed gas in the lean premixed gas combustion chamber to generate a second high-temperature and high-pressure burned gas containing the oxygen which is unreacted;

accelerating, by using an interpenetrating nozzle which includes a plurality of nozzles arranged in an interpenetrating manner, the first and second high-temperature and high-pressure burned gases respectively to hypersonic speed such that their static temperatures descend and they are mixed together; and barring a premixed gas flow obtained by mixing the first and the second high-temperature and high-pressure burned gases by a steady-state detonation stabilizer, such that a stabilized detonation wave is generated.

17. A steady-state detonation combustor to combust a premixed gas containing a gas fuel and oxygen by generating a detonation wave in steady state with respect to a static system, comprising:

a rich premixed gas combustion chamber to combust a detonative rich premixed gas in which said gas fuel is in a rich state with respect to said oxygen;

a lean premixed gas combustor to combust a detonative lean premixed gas in which said gas fuel is in a lean state with respect to said oxygen; and interpenetrating nozzles including a plurality of nozzles arranged in an interpenetrating manner, in which a first high-temperature and high-pressure burned gas containing said unreacted gas fuel obtained by combusting said rich premixed gas in said rich premixed gas combustion chamber, and a second high-temperature and high-pressure burned gas containing said unreacted oxygen obtained by combusting said lean premixed gas in said lean premixed gas combustion chamber, are respectively accelerated to hypersonic speed, such that their static temperatures descend and at the same time they are mixed together.

* * * * *

UNITED STATES PATENT AND TRADEMARK OFFICE
CERTIFICATE OF CORRECTION

PATENT NO. : 7,310,951 B2
APPLICATION NO. : 10/509903
DATED : December 25, 2007
INVENTOR(S) : Jiro Kasahara It is certified that error appears in the above-identified patent and that said Letters Patent is hereby corrected as shown below:

Column 14, line 10:   change "unrecated" to --unreacted--.

Column 16, line 18:   change "to an lean" to --to a lean--.

Signed and Sealed this

Sixth Day of May, 2008

JON W. DUDAS
*Director of the United States Patent and Trademark Office*